US009165575B2

(12) United States Patent
Aoyama et al.

(10) Patent No.: US 9,165,575 B2
(45) Date of Patent: Oct. 20, 2015

(54) SIDE SHIELD READER WITH A SHIELD EXCITING COIL

(71) Applicant: HGST Netherlands B.V., Amsterdam (NL)

(72) Inventors: Jun Aoyama, Yokohama (JP); Mikito Sugiyama, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/194,529

(22) Filed: Feb. 28, 2014

(65) Prior Publication Data

US 2015/0248904 A1 Sep. 3, 2015

(51) Int. Cl.
*G11B 5/39* (2006.01)
*G11B 5/127* (2006.01)

(52) U.S. Cl.
CPC ............ *G11B 5/3912* (2013.01); *G11B 5/1272* (2013.01)

(58) Field of Classification Search
CPC .... G11B 5/3932; G11B 5/398; G11B 5/3903; G11B 5/1272
USPC ................... 360/319, 324.12, 327.3
See application file for complete search history.

(56) References Cited

U.S. PATENT DOCUMENTS

| 4,698,711 | A | * | 10/1987 | Vinal .............................. 360/321 |
| 4,816,947 | A | * | 3/1989 | Vinal et al. ..................... 360/321 |
| 4,860,138 | A | * | 8/1989 | Vinal et al. ............... 360/327.24 |
| 5,159,511 | A | * | 10/1992 | Das .......................... 360/327.33 |
| 6,661,627 | B1 | * | 12/2003 | Kadokawa ................. 360/327.3 |
| 2003/0021070 | A1 | * | 1/2003 | Ohtsu et al. ................... 360/317 |
| 2005/0195535 | A1 | * | 9/2005 | Shi et al. .................. 360/324.12 |
| 2012/0087045 | A1 | | 4/2012 | Yanagisawa et al. |

FOREIGN PATENT DOCUMENTS

JP 04026907 * 1/1992

* cited by examiner

*Primary Examiner* — Angel Castro
(74) *Attorney, Agent, or Firm* — Zilka-Kotab, PC

(57) ABSTRACT

In one embodiment, an apparatus includes at least one read head, each read head including a magnetoresistive (MR) read element, having a lower shield layer, an underlayer positioned above the lower shield layer, an antiferromagnetic (AFM) layer positioned above the underlayer, a magnetization pinned layer positioned above the AFM layer, an insulating layer positioned above the magnetization pinned layer, and a magnetization free layer positioned above the insulating layer, magnetic side shields positioned on both sides of the MR read element in a cross-track direction, and at least one shield excitation coil configured to excite magnetization of the side shields. In another embodiment, a method for forming a read sensor includes forming a MR read element, forming magnetic side shields on both sides of the MR read element in a cross-track direction, and forming at least one shield excitation coil configured to excite magnetization of the side shields.

20 Claims, 10 Drawing Sheets

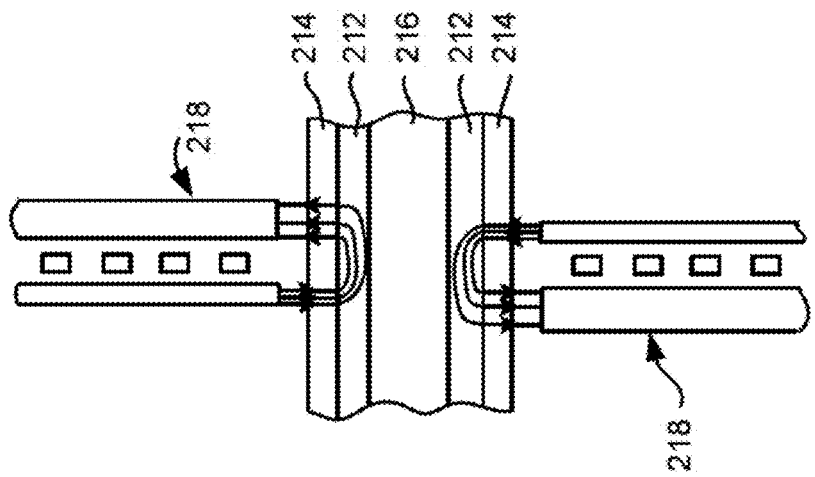
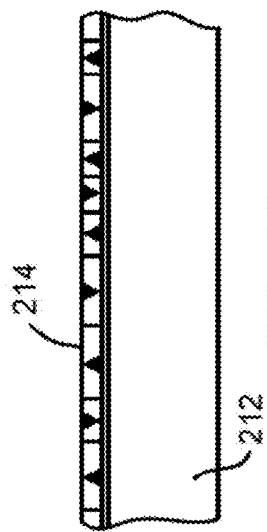
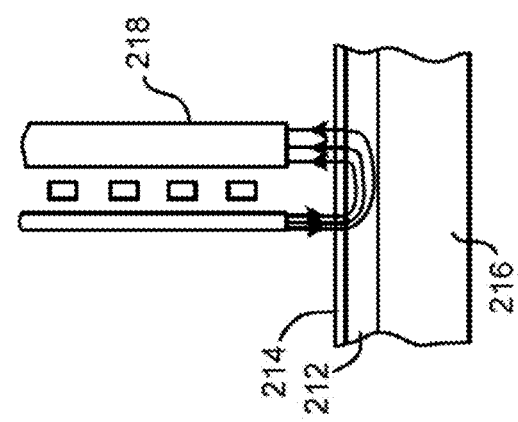
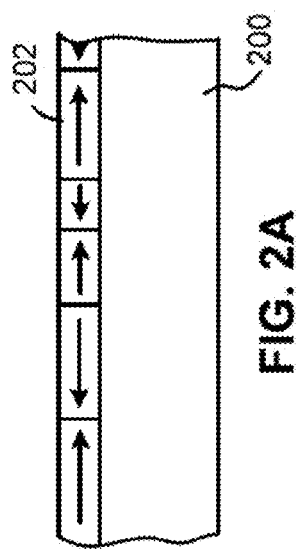
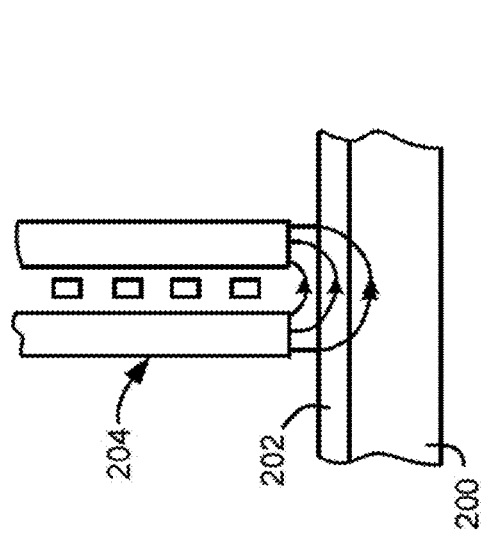

SIDE SHIELD READER WITH A SHIELD EXCITING COIL

FIELD OF THE INVENTION

The present invention relates to magnetic heads, and more particularly, this invention relates to a magnetoresistive head comprising a side shield with a shield exciting coil.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components. One approach to achieve this reduction in component size is to use a magnetoresistive (MR) read head having a spin valve element.

A MR read head comprising a spin valve element is generally used for a read head employed in a HDD. A hard bias read head or reader in which a hard magnetic material is provided in the track width direction of the spin valve element, and a side shield read head (or a side shielded reader, as described in U.S. Patent Application Publication No. 2012/0087045) in which a soft magnetic material is provided instead of a hard magnetic material are known in the art.

In a side shield read head, the sensitivity at the edges in the read sensitivity distribution is reduced as a result of the soft magnetic material being provided in the track width direction of the spin valve element. This reduction in sensitivity at the edges of the sensitivity distribution is due to the spin valve element attracting the magnetic field generated in the central portion of the recording track, while the soft magnetic material magnetic shield absorbs the magnetic field generated at the periphery of the track width. It is possible to reduce read-out noise at the track ends and interference from adjacent tracks as a result of the reduction in sensitivity at the edges, and therefore it is possible to increase the track density. Side shield read heads have therefore have become more popular in recent years.

Reducing the geometric dimensions of the actual spin valve element is also effective for improving the track density. Reducing the dimensions of the element in the track width direction facilitates reading-out of magnetic information in recording tracks having a narrow recording width. Currently, the dimensions of a spin valve element are below about 50 nm.

However, new problems have arisen as spin valve elements have become smaller. This includes variations in the characteristics of individual read heads. There are fluctuations (production variations) in the film-forming conditions of the film-forming process for spin valve elements, etc. These fluctuations affect the shape, size, and film characteristics of the elements, and are manifested as variations in the read characteristics of the spin valve element. One effect of the fluctuations becomes relatively larger as the size of the elements decreases.

Head signal-to-noise ratio (SNR) is one read characteristic. Head SNR is defined as the ratio of the magnitude of the output of read signals in a low-density recording pattern to the head noise caused by the read head. In general, the greater the head SNR, the more accurately recorded information is able to be read out from the medium.

FIG. 5 shows the relationship of head SNR and read utilization for a plurality of read heads produced under the same conditions. Here, read utilization is defined as the ratio of the amount of variation in resistance when a medium field is applied to individual spin valve elements to the maximum amount of variation in resistance. The magnitude of the read output is proportional to the magnitude of the read utilization, and therefore there is a very close relationship between head SNR and read utilization. In FIG. 5, the read utilization should be around 35% in order to achieve the best head SNR. However, the utilization of individual heads is scattered in a range between less than 25% and 45%, so not all of the heads are optimized. Also, the head SNR decreases outside the optimum range and therefore, any read operations to read recorded signals may be inadequate. The proportion of products which operate in accordance with the specification is referred to as the yield. Variations in read utilization may cause a reduction in yield so steps should be taken against this.

SUMMARY

In one embodiment, a read sensor includes a magnetoresistive (MR) read element, magnetic side shields positioned on both sides of the MR read element in a cross-track direction, and at least one shield excitation coil configured to excite magnetization of the side shields.

In another embodiment, a method for forming a read sensor includes forming a MR read element, forming magnetic side shields on both sides of the MR read element in a cross-track direction, and forming at least one shield excitation coil configured to excite magnetization of the side shields.

In yet another embodiment, an apparatus includes at least one read head, each read head including a MR read element, having a lower shield layer, an underlayer positioned above the lower shield layer, an antiferromagnetic (AFM) layer positioned above the underlayer, a magnetization pinned layer positioned above the AFM layer, an insulating layer positioned above the magnetization pinned layer, a magnetization free layer positioned above the insulating layer, and a cap layer positioned above the magnetization free layer, magnetic side shields positioned on both sides of the MR read element in a cross-track direction, and at least one shield excitation coil configured to excite magnetization of the side shields, a magnetic medium, a drive mechanism for passing the magnetic medium over the at least one read head, and a controller electrically coupled to the at least one read head for controlling operation of the at least one read head.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

Figure 1:
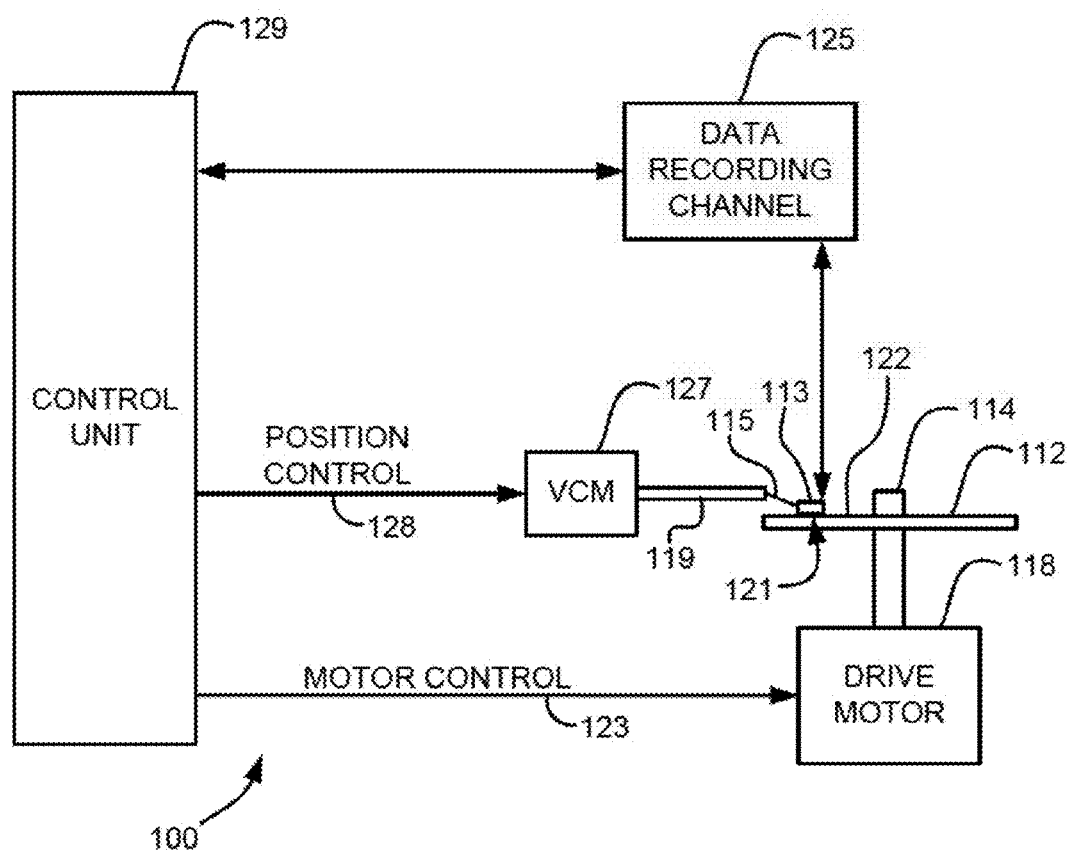
FIG. 1 is a simplified drawing of a magnetic recording disk drive system.

The following description is made for the purpose of illustrating the general principles of the present invention and is not meant to limit the inventive concepts claimed herein. Further, particular features described herein may be used in combination with other described features in each of the various possible combinations and permutations, without necessarily being fixed to one particular embodiment or approach.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

According to one embodiment, a side shield read head may be provided with an electromagnetic coil for exciting a side shield. The intensity of the bias field applied to the spin valve element may be adjusted according to the extent to which the shield is excited.

When there is no medium field, the magnetization direction in the free layer of the spin valve element may be pinned in the direction of the bias field in one approach. On the other hand, the magnetization direction varies under the influence of the medium field during a read operation. In this case, if the bias field is very intense, there is unlikely to be influence from the medium field and the amount of variation in the magnetization direction decreases. As a result, the read utilization decreases. Conversely, when the bias field is not very intense, there is likely to be influence from the medium field, the magnetization direction varies by a large amount, and the read utilization increases. By virtue of the read head being constructed as described herein according to various embodiments, the intensity of the bias field applied to the spin valve element may be adjusted according to the extent to which the shield is excited. This means that it is possible to optimize the read utilization for individual heads, and therefore it is possible to solve the problem of variations in read utilization.

In one general embodiment, a read sensor includes a magnetoresistive (MR) read element, magnetic side shields positioned on both sides of the MR read element in a cross-track direction, and at least one shield excitation coil configured to excite magnetization of the side shields.

In another general embodiment, a method for forming a read sensor includes forming a MR read element, forming magnetic side shields on both sides of the MR read element in a cross-track direction, and forming at least one shield excitation coil configured to excite magnetization of the side shields.

In yet another general embodiment, an apparatus includes at least one read head, each read head including a MR read element, having a lower shield layer, an underlayer positioned above the lower shield layer, an antiferromagnetic (AFM) layer positioned above the underlayer, a magnetization pinned layer positioned above the AFM layer, an insulating layer positioned above the magnetization pinned layer, a magnetization free layer positioned above the insulating layer, and a cap layer positioned above the magnetization free layer, magnetic side shields positioned on both sides of the MR read element in a cross-track direction, and at least one shield excitation coil configured to excite magnetization of the side shields, a magnetic medium, a drive mechanism for passing the magnetic medium over the at least one read head, and a controller electrically coupled to the at least one read head for controlling operation of the at least one read head.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
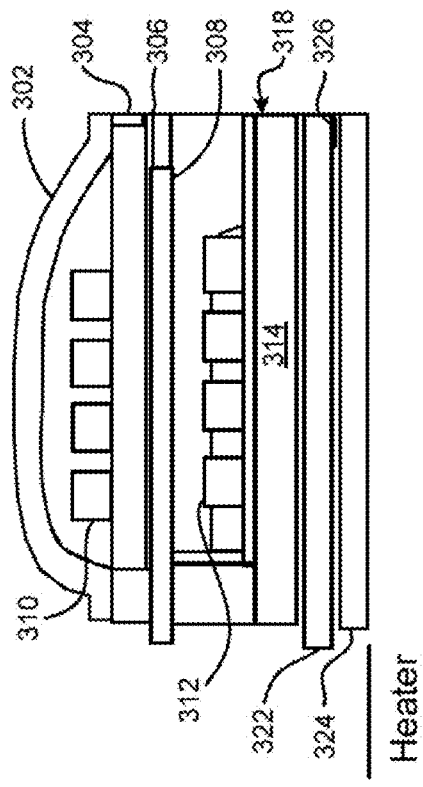
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
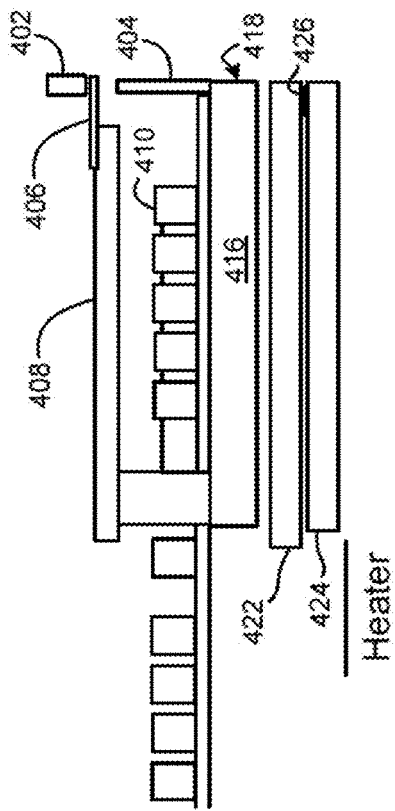
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
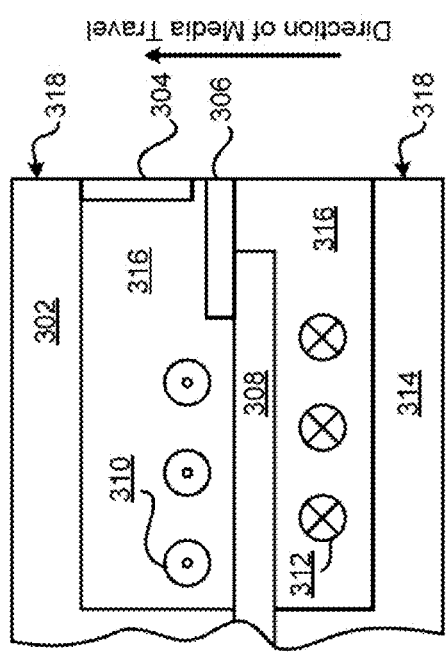
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
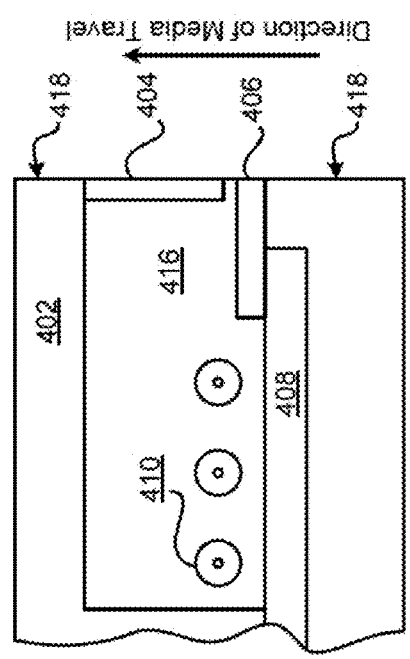
FIG. 4B is a cross-sectional view of one particular embodiment of a piggyback magnetic head with looped coils.
Figure 5:
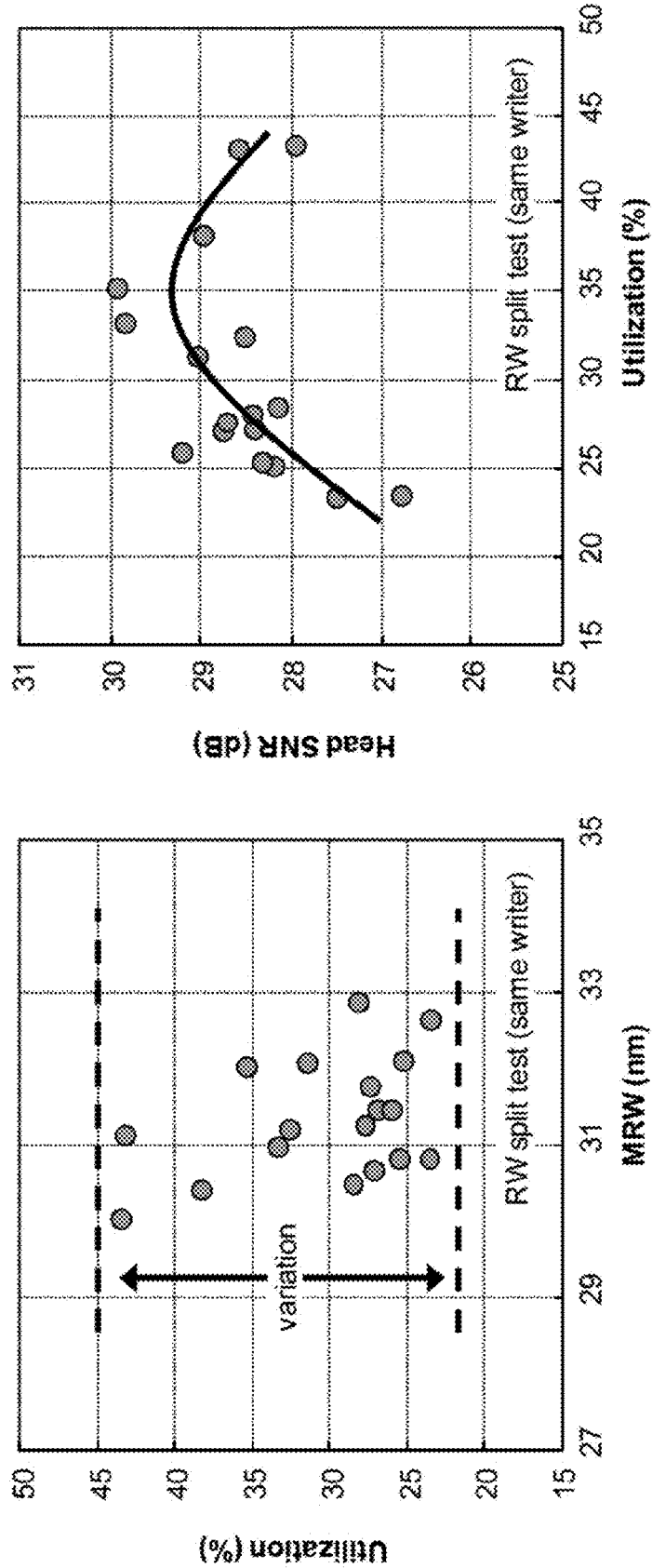
FIG. 5 shows the relationship between read head signal-to-noise ratio (SNR) and read utilization, in one approach.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 6:
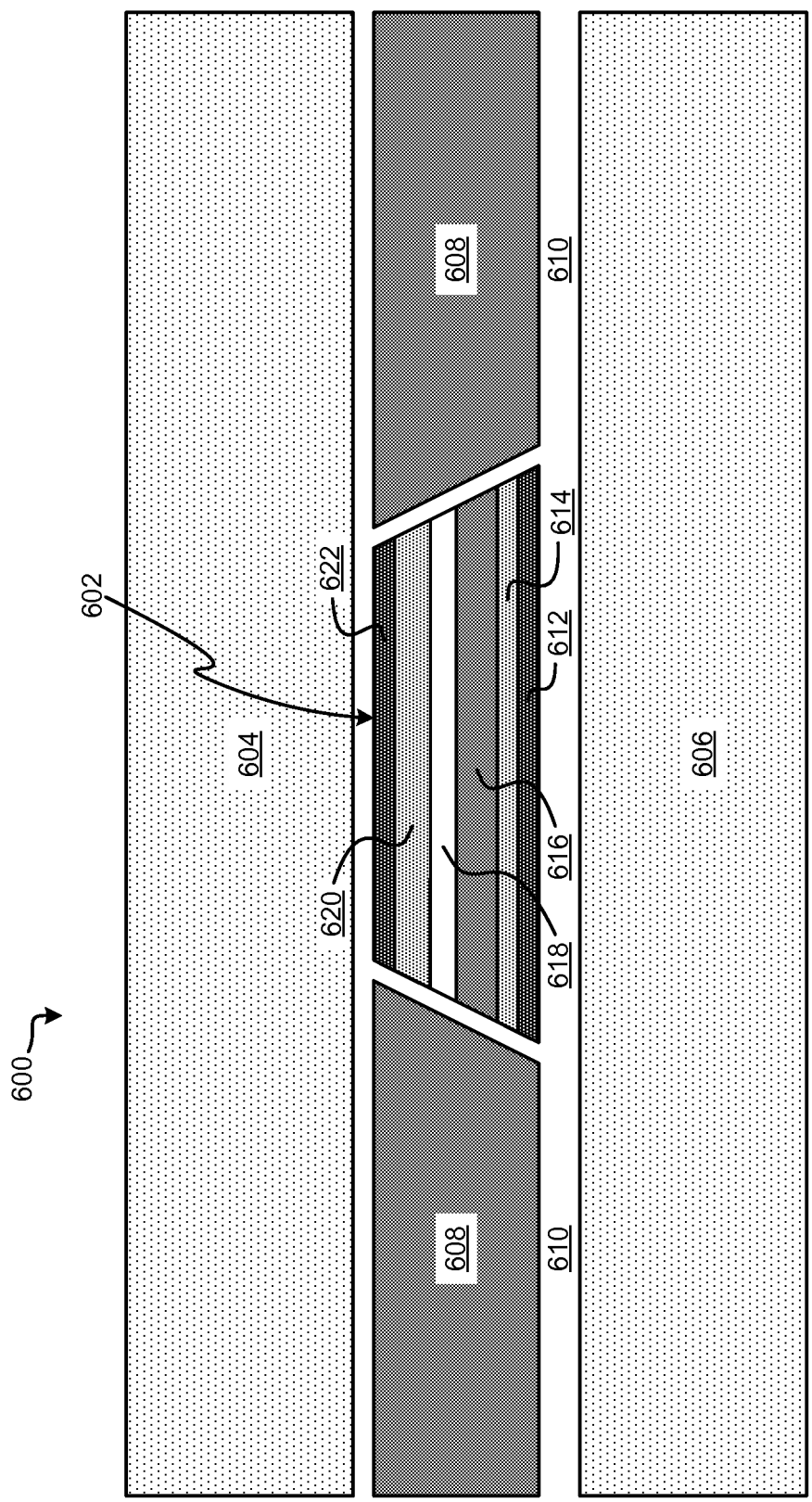
FIG. 6 shows a read structure according to one embodiment.

FIG. 6 shows a read head 600 as seen from a media-facing surface or air bearing surface (ABS) of the read head 600. The read head 600 comprises a MR read element 602 of any conventional design as known in the art (such as a spin valve element) and an upper shield layer 604, a lower shield layer 606, and side shield layers 608 (e.g., a left shield layer and a right shield layer). The spin valve element 602 may comprise a tunneling magnetoresistive (TMR) element, for example. The TMR element may have a stacked structure comprising, in successive order, the lower shield layer 606, an underlayer 612, an antiferromagnetic (AFM) layer 614, a magnetization pinned layer (pinned layer) 616, an insulating layer 618, a magnetization free layer (free layer) 620, a cap layer 622, and the upper shield layer 604. In this structure, NiFe, which is a soft magnetic material, may be used for the lower shield layer 606 according to one approach. CoFe, NiCoFe, or some other suitable material may be used instead of NiFe for the lower shield layer 606 in other approaches.

According to another embodiment, a Ta or Ru compound may be stacked to between about 2 nm and about 4 nm, such as about 3 nm, for the underlayer. In more approaches, the AFM layer may employ between about 2 nm and about 6 nm, such as about 4 nm, of IrMn, the magnetization pinned layer may employ between about 1 nm and about 3 nm, such as about 2 nm, of CoFe, and the insulating layer may employ between about 0.25 nm and about 2 nm, such as about 1 nm, of MgO. A CoFe, CoFeB, CoFeNiB, etc., compound may be stacked to between about 2 nm and about 10 nm, such as about 6 nm, for the magnetization free layer in another approach. In another embodiment, a Ta, Ru, etc., compound may be stacked to about between about 2 nm and about 8 nm, such as about 4 nm, for the cap layer, and NiFe may be used for the upper shield layer 604.

The upper shield layer 604 may have a three-layer structure comprising NiFe/Ru/NiFe in one embodiment. Furthermore, the side shield layers 608 may be formed on both sides of the spin valve element 602 in the cross-track direction in a further embodiment. NiFe may be used for the side shield layers 608 in one approach. CoFe, NiCoFe, or the like may be used instead of NiFe for the side shield layers 608 in more approaches. The side shield layers 608 and spin valve element 602 may be insulated by insulating layers 610 that comprise $AlO_x$ or some other suitable insulating material. The side shield layers 608 and upper shield layer 604 may be magnetically coupled in one approach. In an alternate approach, they may instead be magnetically uncoupled. A bias field generated by the side shield layers 608 may be applied to the spin valve element 602 in some approaches. Elements which have a common name and/or common function as described in FIG. 6 may be used in conjunction with the structures shown in FIGS. 7A-7B, in various approaches.

Figure 7A:
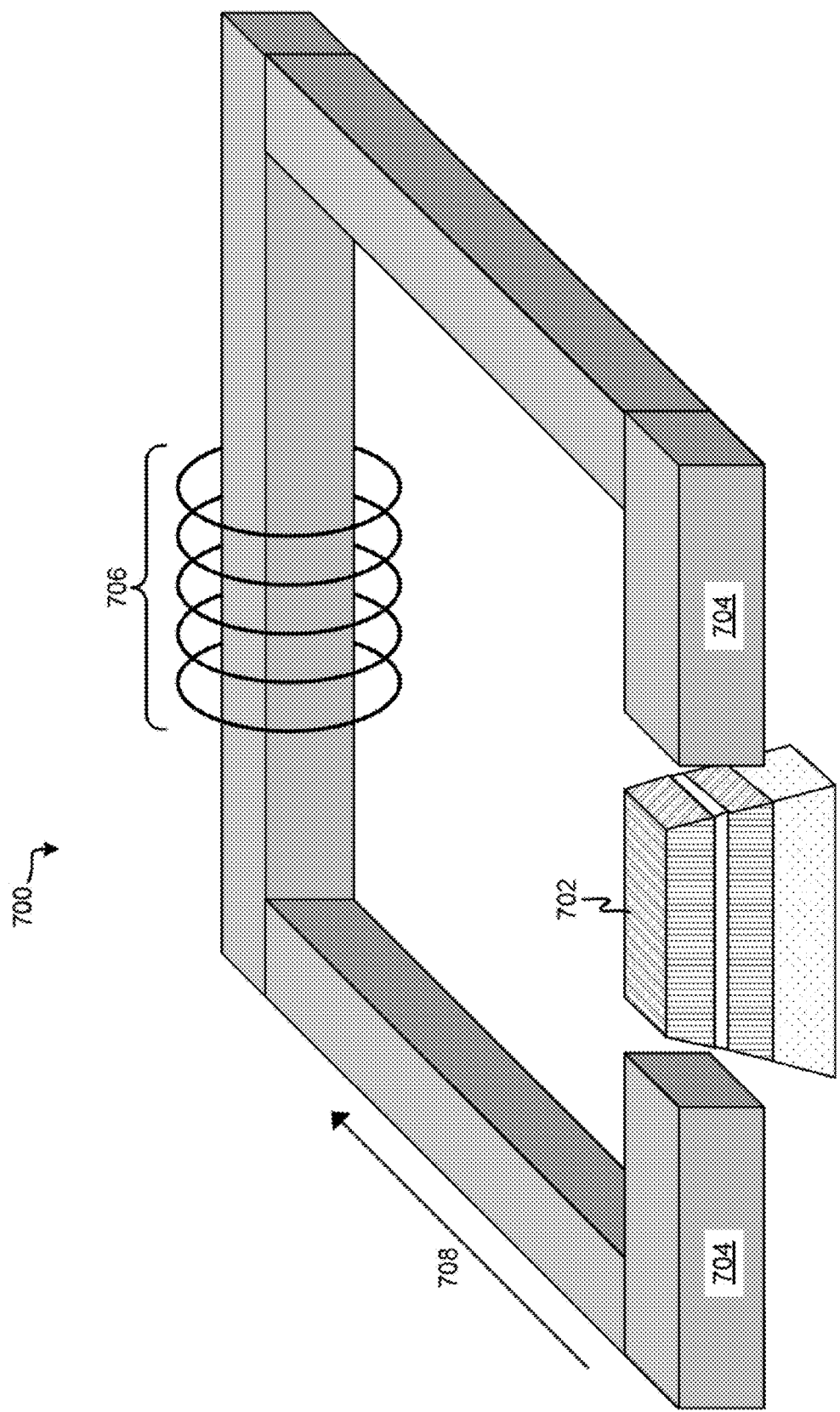
FIG. 7A shows a three-dimensional view of a portion of a read structure according to one embodiment.

FIG. 7A shows a three-dimensional view of a sensor structure 700 according to one embodiment. The side shields 704 formed on the left and right of the spin valve element 702 are coupled at a back portion in an element height direction 708 of the spin valve element 702. Furthermore, one electromagnetic coil 706 for exciting the side shields 704 is provided at a back portion in the element height direction 708 of the spin valve element 702. According to this sensor structure 700, the intensity of the bias field applied to the spin valve element 702 may be adjusted according to the extent to which the side shields 704 are excited. The read utilization of the sensor structure 700 may be reduced when the bias intensity is increased. On the other hand, the read utilization of the sensor structure 700 may be increased when the bias intensity is reduced.

The effects of the sensor structure shown in FIG. 7A have been verified by electromagnetic field calculations employing the finite element method (FEM). The calculation model comprised upper and lower shields, side shields, a spin valve element, and an exciting coil. Side shields were formed on both sides of the spin valve element, and a shield effect which is characteristic of a side shield reader was achieved. The saturated magnetic flux density (Bs) of the side shield layer was 1 Tesla and the magnetic permeability was 50 H/m. The saturated magnetic flux density of the upper and lower shield layers was 1 Tesla and the magnetic permeability was 1000 H/m. Furthermore, the spin valve element was a nonmagnetic material, the field intensity at the middle portion of the track was calculated at a position corresponding to the magnetization free layer, and this was estimated as the bias field.

Furthermore, the shield layer was extended in the element height direction at a position sufficiently remote from the spin valve element, and physically coupled at a back portion thereof. In addition, an electromagnetic coil comprising a material of low electrical resistance, such as Cu, was formed at a back portion in the element height direction. The shield layer may be excited by a flow of current to the coil or through any other method of excitation known in the art.

Figure 7B:
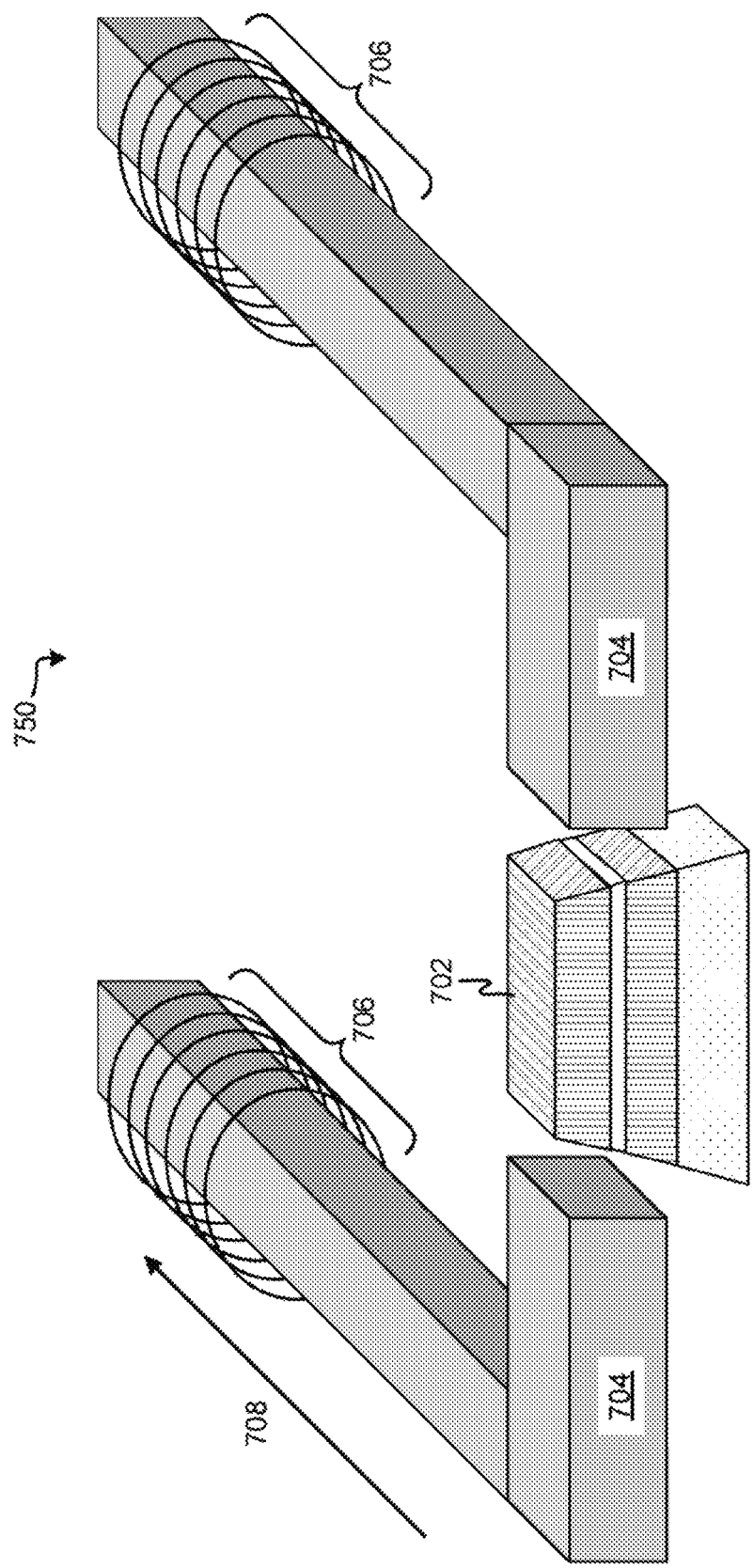
FIG. 7B shows a three-dimensional view of a portion of a read structure according to another embodiment.

Instead of using a structure in which the side shields 704 are coupled at a back portion thereof as shown by structure 700 in FIG. 7A, referring to FIG. 7B, a structure 750 in which the left and right side shields 704 are not physically coupled at a back portion thereof in the height direction 708 of the element may be used, with each side shield 704 having its own separate electromagnetic coil 706.

Figure 8:
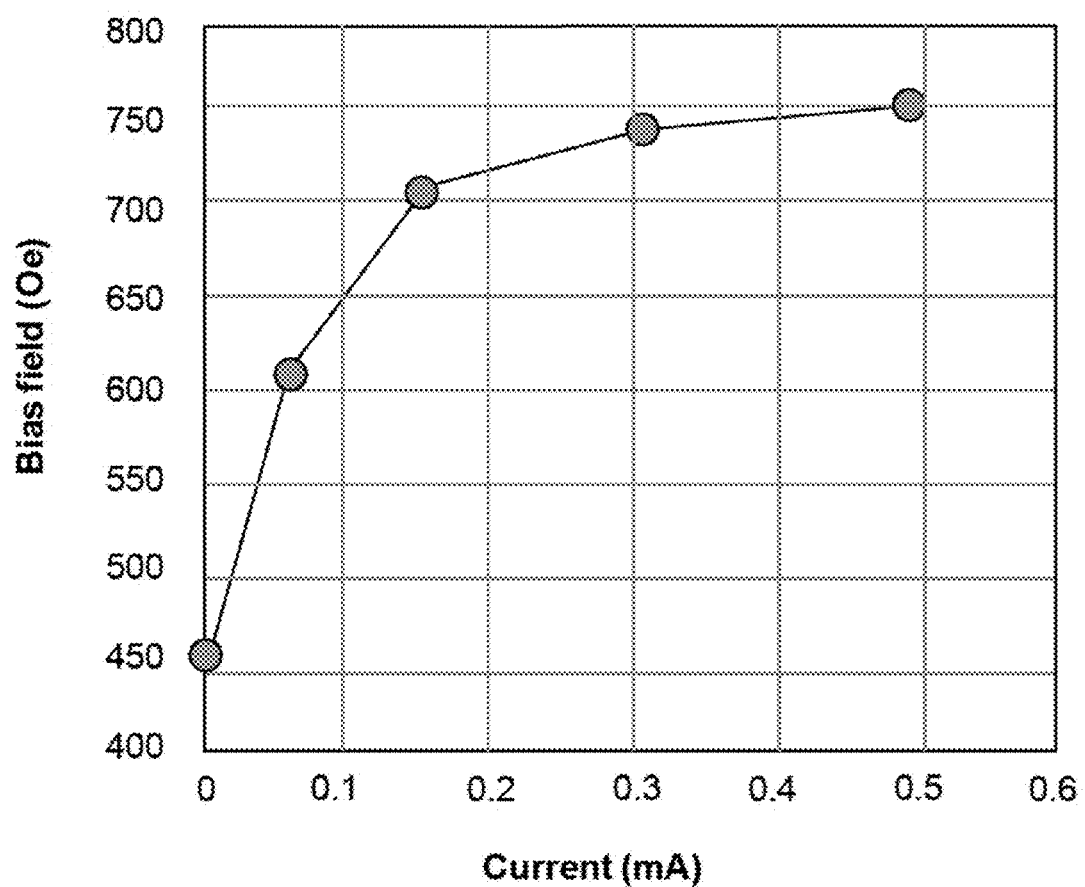
FIG. 8 shows the relationship between the magnitude of the current flowing to the electromagnetic coil and the bias field intensity, in one approach.

FIG. 8 shows the relationship between the magnitude of the current flowing to the electromagnetic coil and the bias field intensity obtained for a sensor structure similar to that shown in FIGS. 7A and/or 7B. It is clear that as the intensity of the current increases, the intensity of the bias field increases. However, when the magnetization of the side shields is completely saturated, the bias field intensity also saturates, rendering a point at which additional current is does not produce additional positive effects.

When there was no medium field, the magnetization direction of the free layer in the spin valve element was pinned in the bias field direction. On the other hand, during a read operation, there was influence from the medium field and the direction of magnetization changed. In this case, when the bias field is very intense, there is unlikely to be influence from the medium field and the amount of variation in the magnetization direction decreases. As a result, the read utilization decreases. Conversely, when the bias field is not very intense (relative to other conditions experienced), there is likely to be influence from the medium field, the magnetization direction varies by a large amount, and the read utilization increases.

Figure 9:
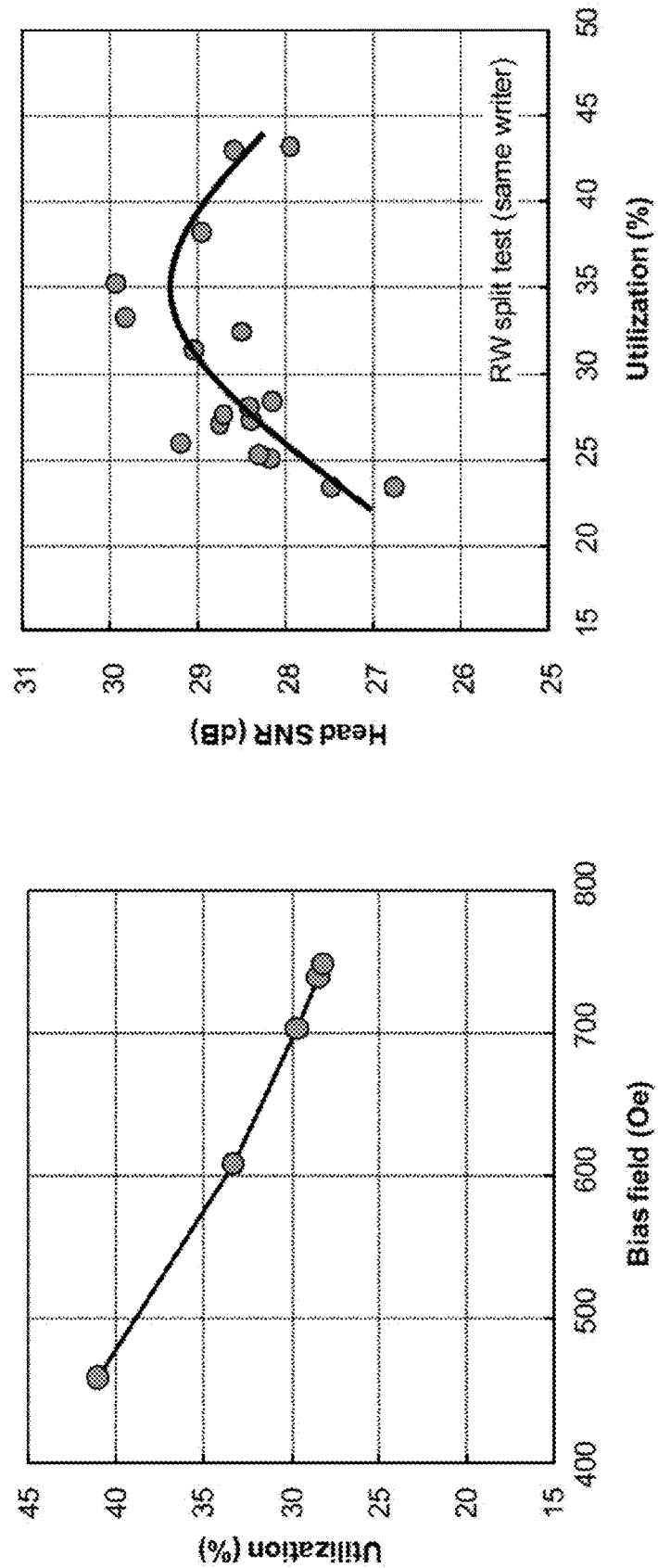
FIG. 9 shows the relationship of the bias field intensity and read utilization according to calculations along with the relationship between read utilization and head SNR according to measurements.

FIG. 9 shows the relationship of the bias field intensity and read utilization according to calculations, along with the relationship between read utilization and head SNR according to measurements. Read utilization may be varied by adjusting the magnitude of the bias field. Read utilization may therefore be optimized in individual heads, and it is possible to achieve a high read head SNR, while at the same time variations in the read utilization of the individual heads being reduced, according to one embodiment.

There are also other methods of using the read head described herein according to various embodiments. Examples of other feasible methods include optimizing and/or normalizing the read characteristics of individual read heads (thereby allowing the read characteristics to become substantially uniform) in a multi-input multi-output (MIMO) read head having a plurality of read heads therein, according to one approach. In another approach, strong excitation may be applied when the read head is in a standby state so that the magnetization direction of the side shield layer and the free layer (which has many magnetic domains) is unified during a read operation (refresh operation). In accordance with another approach, the read utilization may be reduced only in a magnetic transition region having a large amount of noise, thereby reducing the amount of read-out noise and improving the SNR.

According to one embodiment, a read sensor may comprise a MR read element (of a type known in the art, such as TMR, GMR, etc.), magnetic side shields positioned on both sides of the MR read element in a cross-track direction, and at least one shield excitation coil configured to excite magnetization of the side shields to produce a bias magnetic field.

In various approaches, the magnetic side shields may comprise a soft magnetic material, such as NiFe, etc., the magnetic side shields may be magnetically coupled at a back portion thereof in an element height direction where the read sensor comprises only one shield excitation coil, and/or the magnetic side shields may be magnetically isolated where the read sensor comprises two shield excitation coils (one for each magnetic side shield, with the two shield excitation coils being positioned at a back portion of each magnetic side shield in an element height direction thereof).

In one embodiment, the MR read element may comprise a TMR read element, comprising: an underlayer positioned above a lower shield layer, an AFM layer positioned above the underlayer, a magnetization pinned layer positioned above the AFM layer, an insulating layer positioned above the magnetization pinned layer, a magnetization free layer positioned above the insulating layer, and a cap layer positioned above the magnetization free layer.

In some approaches, a magnetic head using a sensor structure and/or read head as described herein according to various embodiments may be used in a magnetic data storage system.

The magnetic data storage system may be similar to that shown in FIG. 1. For example, the magnetic data storage system 100 may comprise at least one magnetic head 121 having a sensor stack as described according to any embodiment herein, a magnetic medium 112, a drive mechanism 118 for passing the magnetic medium 112 over the at least one magnetic head 121, and a controller 129 electrically coupled to the at least one magnetic head 121 for controlling operation of the at least one magnetic head 121.

In a further embodiment, the controller may be configured to provide current to the at least one shield excitation coil during a read operation. In another embodiment, the controller may be configured to provide current to the at least one shield excitation coil when the read sensor is not being used. Of course, the controller, or some other suitable control unit, may be configured to provide current (of variable intensity depending on the desired effect on the coil) at any desired time in order to produce a desired effect, such as a bias magnetic field to aid in reading, etc.

In another embodiment, the at least one shield excitation coil may be independent of any other coils in a magnetic head that comprises the read sensor (e.g., the shield excitation coil is not the same as the write coil).

In another embodiment, an apparatus may comprise: at least one read head, each read head comprising: a MR read element (or multiple MR elements or read sensors), with each MR read element comprising some or all of: a lower shield layer, an underlayer positioned above the lower shield layer, an AFM layer positioned above the underlayer, a magnetization pinned layer positioned above the AFM layer, an insulating layer positioned above the magnetization pinned layer, a magnetization free layer positioned above the insulating layer, and a cap layer positioned above the magnetization free layer. Each of the at least one read heads also include magnetic side shields positioned on both sides of the MR read element in a cross-track direction, and at least one shield excitation coil configured to excite magnetization of the side shields. The apparatus also includes a magnetic medium, a drive mechanism for passing the magnetic medium over the at least one read head, and a controller electrically coupled to the at least one read head for controlling operation of the at least one read head.

In a further embodiment, the controller may be configured to provide current to the at least one shield excitation coil to adjust a read utilization of the at least one read head by changing an intensity of a bias field produced by the magnetic side shields.

Furthermore, in one embodiment, the magnetic side shields may be magnetically isolated and the at least one read head may comprise two shield excitation coils, one for each magnetic side shield.

In an alternate embodiment, the magnetic side shields may be magnetically isolated, and each read head may comprise two shield excitation coils positioned at a back portion of each of the magnetic side shields in an element height direction thereof.

Figure 10:
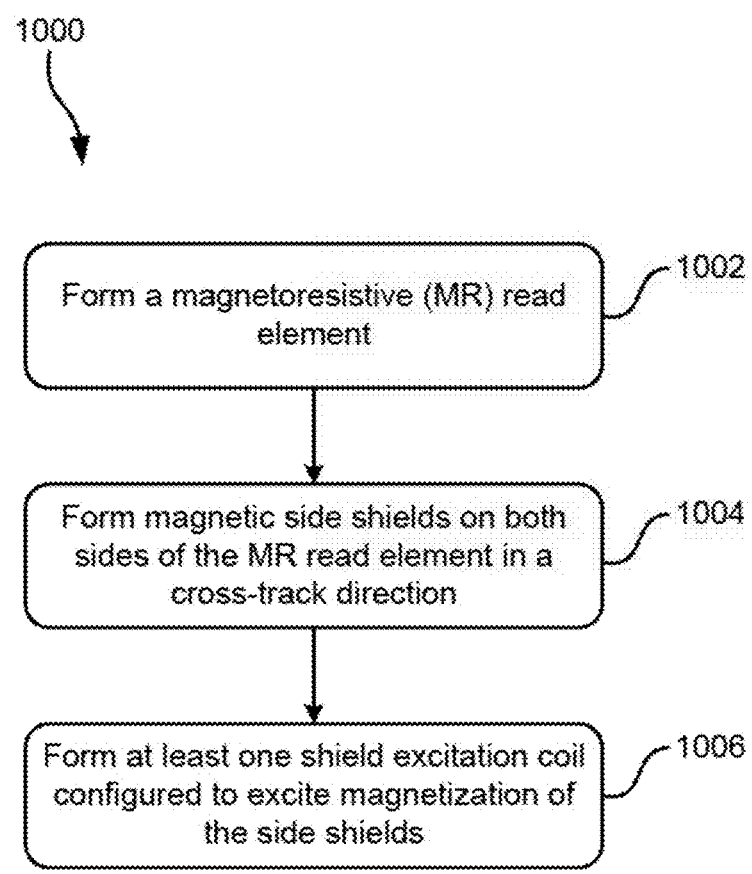
FIG. 10 shows a flowchart of a method according to one embodiment.

Now referring to FIG. 10, a method 1000 for forming a read sensor (which may be part of a read head or some other apparatus) is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Any formation technique may be used to form any of the layers, structures, films, and other components of method 1000 described herein, such as sputtering, plating, spin coating, chemical vapor deposition (CVD), atomic layer deposition (ALD), physical vapor deposition (PVD), etc.

Furthermore, any magnetic (such as alloys of Co, Fe, Ni, and/or Pt, etc.), nonmagnetic (such as Cu, Al, etc.), and/or insulating material (alumina, MgO, $Ta_2O_5$, etc.) may be used, as appropriate, to form the layers described in method 1000, or any other suitable materials known in the art.

Of course, this method 1000 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

The method 1000 may begin with operation 1002, where a MR read element is formed. The MR element may comprise any suitable magnetic and/or non-magnetic materials, as known in the art.

In operation 1004, magnetic side shields are formed on both sides of the MR read element in a cross-track direction.

In operation 1006, at least one shield excitation coil is formed. The at least one shield excitation coil is configured to excite magnetization of the magnetic side shields.

In various approaches, the magnetic side shields may comprise a soft magnetic material, such as NiFe, etc., the magnetic side shields may be magnetically coupled at a back portion thereof in an element height direction where the read sensor comprises only one shield excitation coil, and/or the magnetic side shields may be magnetically isolated where the read sensor comprises two shield excitation coils (one for each magnetic side shield, with the two shield excitation coils being positioned at a back portion of each magnetic side shield in an element height direction thereof).

In one embodiment, the MR read element may comprise a TMR read element, and method 1000 may further comprise: forming a lower shield layer, forming an underlayer positioned above the lower shield layer, forming anu AFM layer positioned above the underlayer, forming a magnetization pinned layer positioned above the AFM layer, forming an insulating layer positioned above the magnetization pinned layer, forming a magnetization free layer positioned above the insulating layer, and forming a cap layer positioned above the magnetization free layer, and forming an upper shield layer above the cap layer.

From the FEM calculation simulations, the bias field strength provided to a magnetic free layer in a MR element may be changed by exciting the magnetic side shields. Read utilization can be changed by adjusting bias field strength. Therefore, for each integrated read head, the sensor utilization may be optimized and head SNR may be able to be improved with this system. Also, in other uses, servo head instability may be improved. On the track edge of a NULL servo pattern, sensor utilization may become extremely large because the magnetic field from a medium cancels the bias field from the side shields. This phenomenon causes servo error that relates to servo head instability. Utilization controllability is instrumental in preventing the instability from occurring.

It should be noted that methodology presented herein for at least some of the various embodiments may be implemented, in whole or in part, in computer hardware, software, by hand, using specialty equipment, etc., and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A read sensor, comprising:
a magnetoresistive (MR) read element;
magnetic side shields positioned on both sides of the MR read element in a cross-track direction;
at least one shield excitation coil configured to excite magnetization of the side shields; and
an insulating layer positioned at least on both ends of the MR read element in the cross-track direction for electrically insulating the MR read element from the magnetic side shields.

2. The read sensor as recited in claim 1, wherein the magnetic side shields comprise a soft magnetic material.

3. The read sensor as recited in claim 1, wherein the MR read element comprises a tunneling magnetoresistive (TMR) read element.

4. The read sensor as recited in claim 3, wherein the TMR read element comprises:
an underlayer positioned above a lower shield layer;
an antiferromagnetic (AFM) layer positioned above the underlayer;
a magnetization pinned layer positioned above the AFM layer;
an insulating layer positioned above the magnetization pinned layer;
a magnetization free layer positioned above the insulating layer; and
a cap layer positioned above the magnetization free layer.

5. The read sensor as recited in claim 1, wherein the magnetic side shields are magnetically coupled at a back portion thereof in an element height direction, and wherein the read sensor comprises only one shield excitation coil.

6. The read sensor as recited in claim 1, wherein the magnetic side shields are magnetically isolated from one another, and wherein the read sensor comprises two shield excitation coils, one for each magnetic side shield.

7. The read sensor as recited in claim 6, wherein the two shield excitation coils are positioned at a back portion of each magnetic side shield in an element height direction thereof.

8. A magnetic data storage system, comprising:
at least one read head comprising a read sensor as recited in claim 1;
a magnetic medium;
a drive mechanism for passing the magnetic medium over the at least one read head; and
a controller electrically coupled to the at least one read head for controlling operation of the at least one read head.

9. The magnetic data storage system as recited in claim 8, wherein the controller is configured to provide current to the at least one shield excitation coil during a read operation.

10. The magnetic data storage system as recited in claim 8, wherein the controller is configured to provide current to the at least one shield excitation coil when the read sensor is not being used.

11. The read sensor as recited in claim 1, wherein the at least one shield excitation coil is independent of any other coils in a magnetic head that comprises the read sensor.

12. A method for forming a read sensor, the method comprising:
   forming a magnetoresistive (MR) read element;
   forming an insulating layer on at least both ends of the MR element in a cross-track direction;
   forming magnetic side shields on both sides of the MR read element in the cross-track direction, wherein the magnetic side shields are insulated from the MR element by the insulating layer; and
   forming at least one shield excitation coil configured to excite magnetization of the side shields.

13. The method as recited in claim 12, wherein the magnetic side shields comprise a soft magnetic material.

14. The method as recited in claim 12, further comprising:
   forming a lower shield layer;
   forming an underlayer above the lower shield layer;
   forming an antiferromagnetic (AFM) layer above the underlayer;
   forming a magnetization pinned layer above the AFM layer;
   forming an insulating layer above the magnetization pinned layer;
   forming a magnetization free layer above the insulating layer;
   forming a cap layer above the magnetization free layer; and
   forming an upper shield layer above the cap layer,
   wherein the MR read element comprises a tunneling magnetoresistive (TMR) read element.

15. The method as recited in claim 12, wherein the magnetic side shields are magnetically coupled at a back portion thereof in an element height direction, and wherein the read sensor comprises only one shield excitation coil.

16. The method as recited in claim 12, wherein the magnetic side shields are magnetically isolated from one another, wherein the read sensor comprises two shield excitation coils, one for each magnetic side shield, and wherein the two shield excitation coils are positioned at a back portion of each magnetic side shield in an element height direction thereof.

17. An apparatus, comprising:
   at least one read head, each read head comprising:
      a magnetoresistive (MR) read element, comprising:
         a lower shield layer;
         an underlayer positioned above the lower shield layer;
         a magnetization pinned layer positioned above the underlayer;
         an insulating layer positioned above the magnetization pinned layer;
         a magnetization free layer positioned above the insulating layer; and
         a cap layer positioned above the magnetization free layer;
      an insulating layer positioned at least on both ends of the MR read element in a cross-track direction;
      magnetic side shields positioned on both sides of the MR read element in the cross-track direction and insulated from the MR read element by the insulating layer; and
      at least one shield excitation coil configured to excite magnetization of the side shields;
   a magnetic medium;
   a drive mechanism for passing the magnetic medium over the at least one read head; and
   a controller electrically coupled to the at least one read head for controlling operation of the at least one read head.

18. The apparatus as recited in claim 17, wherein the controller is configured to provide current to the at least one shield excitation coil to adjust a read utilization of the at least one read head by changing an intensity of a bias field produced by the magnetic side shields.

19. The apparatus as recited in claim 17, wherein the magnetic side shields are magnetically isolated from one another and the at least one read head comprises two shield excitation coils, one for each magnetic side shield.

20. The apparatus as recited in claim 17, wherein the magnetic side shields are magnetically isolated from one another, and wherein each read head comprises two shield excitation coils positioned at a back portion of each of the magnetic side shields in an element height direction thereof.

* * * * *

UNITED STATES PATENT AND TRADEMARK OFFICE
CERTIFICATE OF CORRECTION

PATENT NO. : 9,165,575 B2  
APPLICATION NO. : 14/194529  
DATED : October 20, 2015  
INVENTOR(S) : Jun Aoyama et al.

Page 1 of 1

It is certified that error appears in the above-identified patent and that said Letters Patent is hereby corrected as shown below:

In the specification:

col. 11, line 41 replace "forming anu" with --forming an--.

Signed and Sealed this
Twenty-third Day of February, 2016

Michelle K. Lee
*Director of the United States Patent and Trademark Office*